United States Patent
Chong et al.

(10) Patent No.: US 7,451,091 B2
(45) Date of Patent: Nov. 11, 2008

(54) METHOD FOR DETERMINING TIME BORDERS AND FREQUENCY RESOLUTIONS FOR SPECTRAL ENVELOPE CODING

(75) Inventors: Kok Seng Chong, Singapore (SG); Sua Hong Neo, Singapore (SG); Naoya Tanaka, Neyagawa (JP); Takeshi Norimatsu, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 465 days.

(21) Appl. No.: 10/567,601

(22) PCT Filed: Oct. 4, 2004

(86) PCT No.: PCT/JP2004/014977

§ 371 (c)(1),
(2), (4) Date: Feb. 8, 2006

(87) PCT Pub. No.: WO2005/036527

PCT Pub. Date: Apr. 21, 2005

(65) Prior Publication Data

US 2006/0256971 A1    Nov. 16, 2006

(30) Foreign Application Priority Data

Oct. 7, 2003    (JP) .............................. 2003-348621

(51) Int. Cl.
*G10L 21/04*    (2006.01)
(52) U.S. Cl. ..................... 704/500; 704/221; 704/222; 381/22; 381/23
(58) Field of Classification Search ................. 704/500, 704/221, 222; 381/22, 23
See application file for complete search history.

(56) References Cited

U.S. PATENT DOCUMENTS 5,974,380 A    10/1999   Smyth et al.

(Continued)

FOREIGN PATENT DOCUMENTS

EP    0 602 826    6/1994

(Continued)

OTHER PUBLICATIONS

ISO/IEC 14496-3, 2001 FDAM1, Information Technology—Coding of Audio-Visual Objects—Part 3: Audio, Amendment 1: Bandwidth Extension, Feb. 10, 2003, pp. iii-121.

(Continued)

*Primary Examiner*—Daniel D Abebe
(74) *Attorney, Agent, or Firm*—Wenderoth, Lind & Ponack, L.L.P.

(57) ABSTRACT

A frame type for a current SBR frame is determined according to a type of end border of a previous frame, as well as presence of a transient in the current SBR frame. A start border is determined according to the end border of the previous SBR frame. For a FIXFIX frame, a low time-resolution setting is used. For a FIXVAR or a VARVAR frame, a search for intermediate borders is conducted in the region between the transient and maximum allowed end border location. The end border is also determined at this stage. If there is excess capacity for more borders, another search is conducted in the region between the transient and the start border. For a VAR-FIX frame, only one search needs to be conducted, in the whole region partitioned by a variable start border and a fixed end border. All of the above are accomplished with two Forward Search operations and one Backward Search operation. They employ the same principle, which is based on evaluating the signal variation of a time segment, but with minor variations to suit the scenarios in which they are applied.

17 Claims, 18 Drawing Sheets

U.S. PATENT DOCUMENTS

| | | | |
|---|---|---|---|
| 6,377,915 B1 | 4/2002 | Sasaki | |
| 7,181,389 B2 * | 2/2007 | Liljeryd et al. | 704/219 |
| 7,191,121 B2 * | 3/2007 | Liljeryd et al. | 704/219 |
| 2006/0031065 A1 * | 2/2006 | Liljeryd et al. | 704/219 |
| 2006/0053018 A1 * | 3/2006 | Engdegard et al. | 704/500 |

FOREIGN PATENT DOCUMENTS

| | | |
|---|---|---|
| JP | 6-85607 | 3/1994 |
| JP | 6-214600 | 8/1994 |
| JP | 11-504733 | 4/1999 |
| JP | 2000-267700 | 9/2000 |
| JP | 2003-514267 | 4/2003 |
| JP | 2004-53940 | 2/2004 |
| JP | 2004-102095 | 4/2004 |
| WO | 97/31367 | 8/1997 |
| WO | 98/57436 | 12/1998 |
| WO | 01/26095 | 4/2001 |
| WO | 01/37264 | 5/2001 |

OTHER PUBLICATIONS

Supplementary European Search Report (in English language) issued May 20, 2008.

J. Kliewer et al., *"Audio Subband Coding with Improved Representation of Transient Signal Segments"*, Signal Processing: Theories and Applications, Proceedings of EUSIPCO, Sep. 1, 1998, pp. 2345-2348, XP001014252.

\* cited by examiner

METHOD FOR DETERMINING TIME BORDERS AND FREQUENCY RESOLUTIONS FOR SPECTRAL ENVELOPE CODING

TECHNICAL FIELD

The present invention relates to a systematic segmentation method for determining time borders and frequency resolution for bandwidth expansion technologies that employ a subband coding strategy, such as the Spectral Band Replication (SBR) technology. More specifically, the present invention relates to a method for dividing a signal frame into segments appropriate for the subband coding strategy, using time borders and frequency borders in the segment.

BACKGROUND ART

In the subband coding strategy employed in the spectral expansion technologies, such as the SBR technology, it is important to properly segment a signal frame both in a time direction and in a frequency direction in order to prevent a problem that low-energy areas are forced to share the same average energy value as the large-energy areas. This would in turn lead to erroneous amplification at a decoder, which is a common source of audible artifacts.

An objective of audio coding is to transform a digitized audio stream into a compressed bitstream at an audio encoder, so that as high fidelity to original source as possible is retained after the bitstream is processed at the decoder. One popular way of compression is shown in FIG. 1, which shows a typical audio coding system including an encoder and a decoder. A module 1000 divides an audio signal in time domain into consecutive frames, a module 1010 transforms each frame of the audio signal into frequency domain, and a module 1020 quantizes a spectrum up to a certain frequency (known as a bandwidth) at the encoder. FIG. 2 is a typical time/frequency grid representation used in the audio coding. One possible way for the module 1010 to transform the audio signal into frequency domain is the time/frequency grid approach as shown in FIG. 2, where a filterbank is employed to split an audio signal into multiple subbands, each representing a portion of the signal within a narrow frequency range in time domain. At the decoder, the audio spectrum is de-quantized by the module 1030 and inversely transformed by the module 1040 back into audio frames. The audio frames are then appropriately assembled by the module 1050 to form a continuous audio stream.

As a bitrate (number of bits per second) of coding decreases, more sacrifice has to be made to the bandwidth of the audio signal to be transmitted by not coding the high-frequency portion, as it is deemed not as perceptually important as the low frequency portion. The consequence is that some high-frequency tones, and harmonics of the low-frequency tones are shut down. FIG. 3 is a graph illustrating limitation of bandwidth owing to bitrate consideration causes a loss of some high-frequency tones and harmonics. FIG. 3 illustrates the above band-limiting operation, where 2020 indicates the resultant bandwidth of the coded audio.

An objective of the bandwidth expansion is to recover the high-frequency portions, by coding them using very few additional bits. One example of such a technique is the Spectral Band Replication (SBR) method (disclosed in International Patent Publication No. WO98/57436), which is now an MPEG standard (ISO/IEC 14496-3, 2001 AMD1). FIG. 4 is a diagram illustrating a possible encoder of a subband coding scheme for the bandwidth expansion. FIG. 4 illustrates one possible encoder structure for the SBR method that is relevant to the present invention. Firstly, an audio signal is band-splitted into N subbands by N subband filters at an analysis filterbank 3010, each capturing a part of the signal's frequency spectrum. The N signals produced by the filters are decimated to remove redundancy. A bandwidth expansion coder 3020 extracts some information from the filter outputs so that at a decoder, the low-frequency subbands can use the information to expand the bandwidth of the audio signal. The bandwidth expansion information is then multiplexed at a bitstream multiplexer 3030 with the output of a core codec 3000 for encoding the audio signals of the low-frequency subbnads to form a bitstream. A nominal SBR frame consists of L outputs from each subband filter.

FIG. 5 is a diagram illustrating a decoder of the subband coding scheme for the bandwidth expansion. FIG. 5 illustrates the decoder for the SBR method that is relevant to the present invention. Firstly, a bitstream is de-multiplexed at 4000 to become a core audio bitstream and a bandwidth expansion bitstream. A core audio decoder 4010 decodes the core audio bitstream to produce a band-limited audio signal in time domain. The band-limited audio signal is then band-splitted into M subbands by M subband filters of an analysis filterbank 4020. Higher-frequency subbands are synthesized using the bandwidth expansion information at this subband level. The new higher-frequency subbands, as well as the lower-frequency subbands, are up-sampled and assembled by an N-filter synthesis filterbank 4040 to output a final bandwidth-expanded signal.

The output from the analysis filterbank 3010 can be viewed as the time/frequency grid representation of the audio signal as shown in FIG. 2. As a part of the bandwidth expansion information, the time/frequency grid representation is to be divided first in a time direction into 'time segments' and then in a frequency direction into 'frequency bands'. For each frequency band, its average energy is computed, quantized and coded. This process is known as spectral envelope coding. More specifically, in the spectral envelope coding, the audio signal is represented by distribution of the average energy in each segment indicated two-dimensionally by a time axis and a frequency axis. FIG. 6 illustrates such a segmentation process, and is fully described in International Patent Publication No. WO01/26095A1. In FIG. 6, 5010 depicts segmentation in a time direction, and 5020 depicts segmentation in a frequency direction. At the decoder, data generated by this process is used to shape the energy of the synthesised high-frequency bands, so that it takes on the same energy envelope as the original audio signal. Without proper segmentation, low-energy areas would be forced to share the same average energy value as the large-energy areas. This would in turn lead to erroneous amplification at the decoder, which is a common source of audible artefacts.

Each SBR frame is partitioned in a time direction into time segments using 'borders'. The prior art describes a method of using 'fixed' and 'variable' borders to achieve effective spectral envelope coding. FIG. 7 is a diagram showing border relationships between four frame types. Refer to FIG. 7, fixed borders 6060, 6070 and 6100 coincide with borders 6010, 6020 and 6050 of nominal SBR frames, whereas variable borders 6080 and 6090 of a current frame is allowed to encroach into the next nominal SBR frame. A start border and an end border of the 'variable SBR frame' can either be a fixed border or a variable border. If the start border and the end border are both fixed borders, the variable SBR frame coincides with the nominal SBR frame. The end border of the current SBR frame automatically becomes the start border of the next SBR frame.

Between the start border and end border, the SBR frame is further partitioned into several time segments by intermediate borders according to the prior art. If the start border and the end border are both fixed borders, the SBR frame is partitioned into uniform time segments. This is known as a FIX-FIX frame in the prior art (i.e., a FIX border as the start border and a FIX border as the end border). FIG. 8 is a diagram showing the FIXFIX frame with fixed start and end borders. As shown in FIG. 8, 7010 is the start border and 7020 is the end border. If a threshold detector finds a transient region in the current SBR frame, its end border will become a 'variable' border that must be equal to or greater than the next nominal SBR frame.

FIG. 9 is a diagram showing a FIXVAR frame with a fixed start border, a variable end border greater than the nominal SBR frame border, and some intermediate borders specified relative to the end border or each other. The FIXVAR frame has a fixed border as the start border 8010 and a variable border as the end border 8050. Intermediate borders 8020, 8030 and 8040 are specified relative to one another or the variable border, where $d_0$, $d_1$, $d_2$ and the like are relative border distances. According to FIG. 9, the first relative distance $d_0$ must start with the variable border. Subsequent relative distances start with the previously determined intermediate borders.

Since the end border of the current SBR frame automatically becomes the start border of the next SBR frame, it is possible for an SBR frame to have two variable borders in case of transient behaviors in successive SBR frames. FIG. 10 is a diagram showing a VARVAR frame with a variable start border, a variable end border greater than the nominal SBR frame border, and some intermediate borders specified relative to the two variable borders or each other. For the VAR-VAR frame, the intermediate borders can be specified as relative to either one of the variable borders. In FIG. 10, an intermediate border 9020 is relative to the start border 9010, whereas intermediate borders 9030, 9040, and 9050 are relative to each other or the variable end border 9060.

Finally, if the transient detector cannot find any transient in the current SBR frame, but it begins with a variable border, it will still adopt a fixed border as its end border. This is a final frame class introduced in the prior art. FIG. 11 is a diagram showing a VARFIX frame with a variable start border, a fixed end border, and some intermediate borders specified relative to the start border or each other. In FIG. 11, 10010 is the variable start border and 10050 is the fixed end border. 10020, 10030 and 10040 constitute the intermediate borders progressively derived from $d_0$, $d_1$ and $d_2$.

To reduce bit consumption, the relative border distances between the intermediate borders and the variable border can only take on a few pre-determined sizes.

After marking a plurality of time segments with the above-described borders, each time segment, partitioned by two borders, is to be divided in a frequency direction into frequency bands. Exact spectral borders are derived using criteria that are irrelevant to the present invention. FIGS. 12A and 12B are diagrams showing border relationships between high-resolution time segments and low-resolution time segments. FIGS. 12A and 12B show the border relationship between a high-resolution division and a low-resolution division which are two possible resolutions. Borders of the low-resolution divisions are alternate borders of the high-resolution division.

DISCLOSURE OF INVENTION

For the current SBR frame, upon the determination of the start border based on the end border of the previous SBR frame, and the determination of the transient border using the threshold detector, a method is needed to determine the end border, and all intermediate borders. In other words, the determination of the end border and all intermediate borders needs a special technique.

The problem is not straightforward because, as described above, all intermediate borders $d_i$ are to be specified relative to one another or the variable borders, and all relative distances can only take on a few pre-determined sizes, $d_i \in \{D_1, D_2, D_3, D_4\}$, with $0<D_1<D_2<D_3<D_4$. Moreover, only a standard pre-determined number of intermediate borders are permitted. For the FIXVAR and VARVAR frame types, the end border must be equal to or greater than the nominal SBR border. A systematic method is needed to encompass all constraints imposed. In other words, the system for performing the time-frequency grid coding is required to encompass all constrains imposed, and simultaneously to determine the intermediate borders and the end border to increase encoding efficiency.

The spectral coding strategy adopted by the prior art resorts to low time resolution but high spectral resolution (i.e. deriving a frequency spectrum by more frequency bands but few time segments). When a transient is detected, the prior art switches to high time resolution but low spectral resolution (i.e. deriving a frequency spectrum by less frequency bands but more time segments) to code the region after the transient. An objective for switching the degrees of resolution is to account for the fact that the transient tends to exhibit more temporal variation than spectral variation. Lowering the frequency resolution can help curb a sudden surge in bit consumption. However, this method is not sufficient if the post-transient region exhibits a high degree of spectral variation that warrants a higher resolution, such as the case of a sudden burst of a tonal signal.

<Determination of Time Borders>

In order to determine the time borders, an object of the present invention is to provide a systematic method for determining the end border and all intermediate borders while taking into account all standard constraints imposed by the decoder.

As described in the prior art, the frame type for the current SBR frame is determined according to the type of end border of the previous frame, as well as the presence of the transient in the current SBR frame. The start border is also determined according to the end border of the previous SBR frame.

For the FIXFIX frame, a low time resolution setting is used. In other words, the intermediate borders are set at equal time intervals d.

For the FIXVAR frame and the VARVAR frame in which the transient occurs, a search for possible intermediate borders is first conducted in a region after the transient time slot. The end border is also determined at this stage. Then, another search is conducted in a region before the transient time slot for possible intermediate borders, if the first stage has not already exhausted the maximum number of borders allowed.

For the VARFIX frame, only one search needs to be conducted, in the whole region partitioned by a variable start border and a fixed end border.

All of the above are accomplished with two Forward Search operations and one Backward Search operation. They employ the same principle, which is based on evaluating the signal variation of a time segment, but with minor variations to suit the scenarios in which they are applied.

<Determination of Frequency Resolution>

In order to determine the frequency resolution, the present invention provides an adaptive method for objectively assessing the energy variation in a spectral direction.

Since the borders of low-resolution division are the alternate borders of the high-resolution division, the high resolution is first assumed and average energies are computed for each frequency band. For every pairs of frequency bands partitioned by the low-resolution borders, ratios of energy are computed. If a minimum of all energy differences computed for the entire time segment exceeds a pre-determined threshold, a high-frequency resolution is adopted. Otherwise, a low-frequency resolution is adopted. Noting the importance of giving employing high time resolution in the post-transient region, the method applies a stricter criterion for the adoption of the high-frequency resolution in this region.

According to the present invention, a method for determining a time border and a frequency resolution in spectral envelope coding of an audio signal utilizing a time/frequency grid, the method including: deriving a start time border of a current frame from an end time border of a previous frame of envelope data; detecting, by a transient detector, a transient time slot in spectral data between the start time border and the end time border within a predetermined allowed region, a degree of the transient exceeding a certain drasticness; and finding and instantiating an actual end time border and intermediate time borders in the spectral data between the transient time slot and the end time border of the current frame within the predetermined allowed region by comparing the transient drasticness with a predetermined signal variation criterion. By this method, it is possible to realize good sound quality by emphasizing the post-transient region over the pre-transient region, and the region closest to the onset of transient over the region further away, while taking into considerations all imposed syntactic constraints.

Furthermore, the frequency resolution determination method detects distribution of energy in a frequency direction in the post transient regions. The frequency resolution in a time segment is derived by evaluating energy of every frequency band partitioned by low-resolution borders represented by a predetermined frequency for every time segment obtained by dividing the current frame using the intermediate time borders and the end time border. When a large variation in the energy distribution is detected, this method resorts to high-resolution segmentation. The two methods of the present invention realize a good and easily implemented strategy for segmentation of the time/frequency grid representation of the SBR technology.

Furthermore, the present invention can be implemented not only as the method for determining time borders and frequency resolutions for the spectral envelope coding, but also as a program causing a computer to execute the method. The present invention can be further implemented as an audio encoder and an audio decoder in which the method is embedded as a program in an integrated circuit. It is obvious that such a program can be distributed via a transmission medium, for example, the Internet, a recording medium such as CD-ROM, and the like.

BEST MODE FOR CARRYING OUT THE INVENTION

The following method is one example of the above-described SBR technology. However, many modifications are possible in the exemplary embodiment utilizing the spectral envelope coding based on the time/frequency grid.

3.5.1 Determination of Time Borders

The embodiment for the determination of time borders is presented as a series of diagrams shown in FIGS. 13 to 17.

3.5.1.1 Overview

Figure 13:
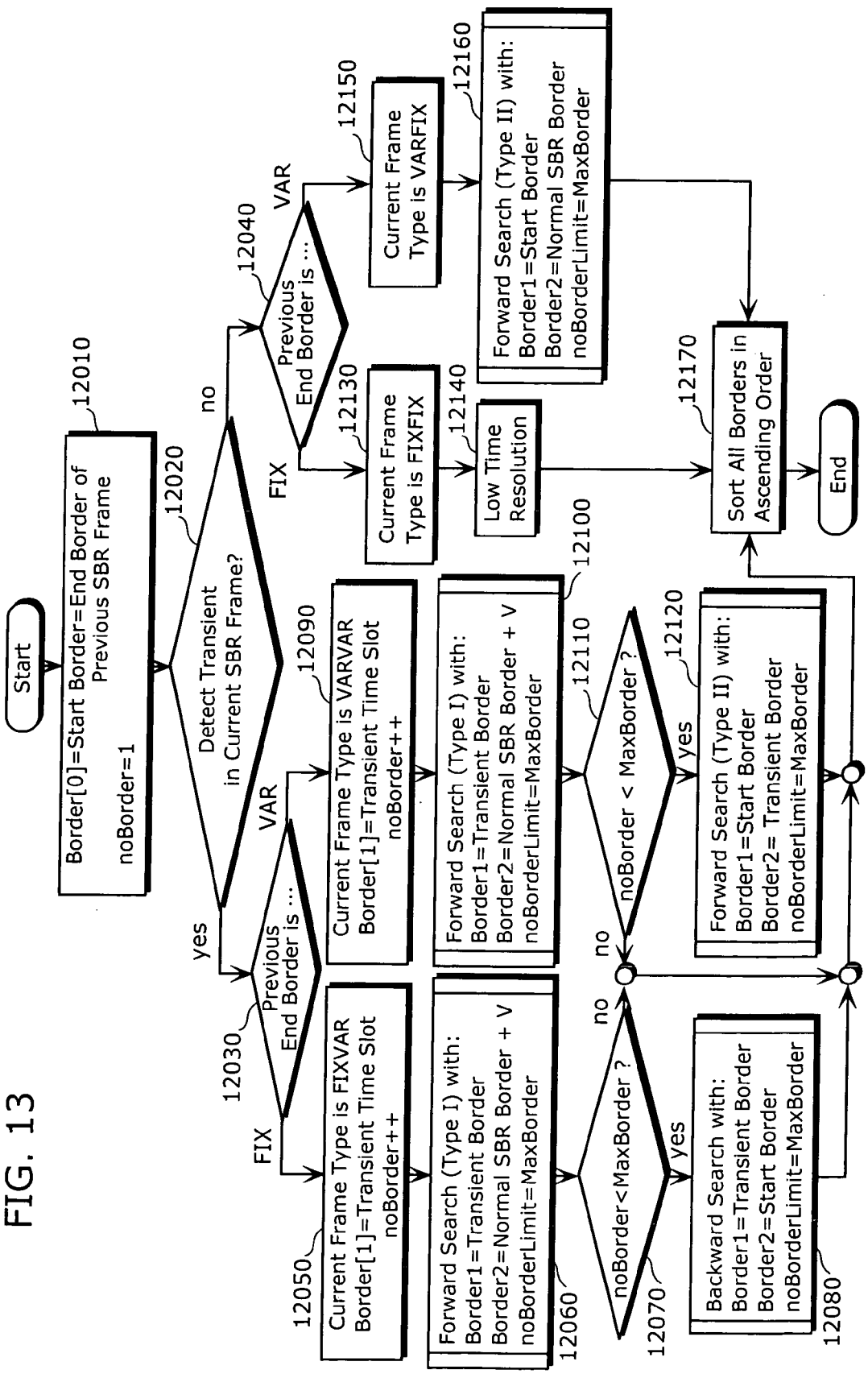
FIG. 13 is a diagram showing an overall flowchart of a time border determination unit of the present invention.

FIG. 13 is a diagram showing an overall flowchart of a time border determination unit of the present invention. FIG. 13 shows an overview of an overall time border determination operation. 12010 sets a first border 'border[0]' to the end border of the previous SBR frame. It also initializes a border counter 'noBorder' to 1. 12020 activates a transient detector for the current frame, to check for the most drastic transient behaviour from border[0] to (next nominal SBR border+V), where V is the amount of transgression into the next SBR frame allowed by the syntax.

If a transient is found, 12030 checks the end border of the previous SBR frame for its type. If it's a fixed border, the current frame becomes a FIXVAR type in 12050; If it's a variable border, the current frame becomes a VARVAR type in 12090. In either case, the transient border is registered in border[1] and the number of borders 'noBorder' in the current frame is incremented.

If a transient is not found, 12040 checks the end border of the previous SBR frame for its type. If it's a fixed border, the current frame becomes a FIXFIX type in 12130; If it's a variable border, the current frame becomes a VARFIX type in 12150.

If the current frame is FIXVAR, 12060 checks the region between the transient and (next nominal SBR border+V) for possible need for intermediate borders. The Forward Search (Type I) method as described further below in 3.5.1.2 is used for this purpose. At the end of Forward Search, noBorder representing the number of borders is checked in 12070. If noBorder is found to be below the maximum allowed number of borders MaxBorder, 12080 uses a Backward Search method to check the region between the transient and the start border and instantiate more intermediate borders if necessary. The above sequence of operations prioritizes the post-transient region in finding intermediate borders.

If the current frame is VARVAR, 12100 checks the region between the transient and (next nominal SBR border+V) for possible need for intermediate borders using the same Forward Search (Type I) method to be described in 3.5.1.2. At the end of Forward Search, noBorder is checked in 12110. If noBorder is found to be below the maximum allowed number of borders MaxBorder, 12120 uses another Forward Search (Type II) method to check the region between the transient and the start border and instantiate more intermediate borders if necessary. Again, the above sequence of operations prioritizes the post-transient region in finding intermediate borders.

If the current frame is FIXFIX, 12140 opts for a low time resolution setting. This process will be discussed in more detail further below in 3.5.2.

If the current frame is VARFIX, 12160 checks the region between the start border and the next nominal SBR frame border for possible need for intermediate borders. The above-described Forward Search (Type I) method is used for this purpose.

The four branches of operations culminate in 12170 which sorts the generated borders in ascending order for later processing.

Figure 14:
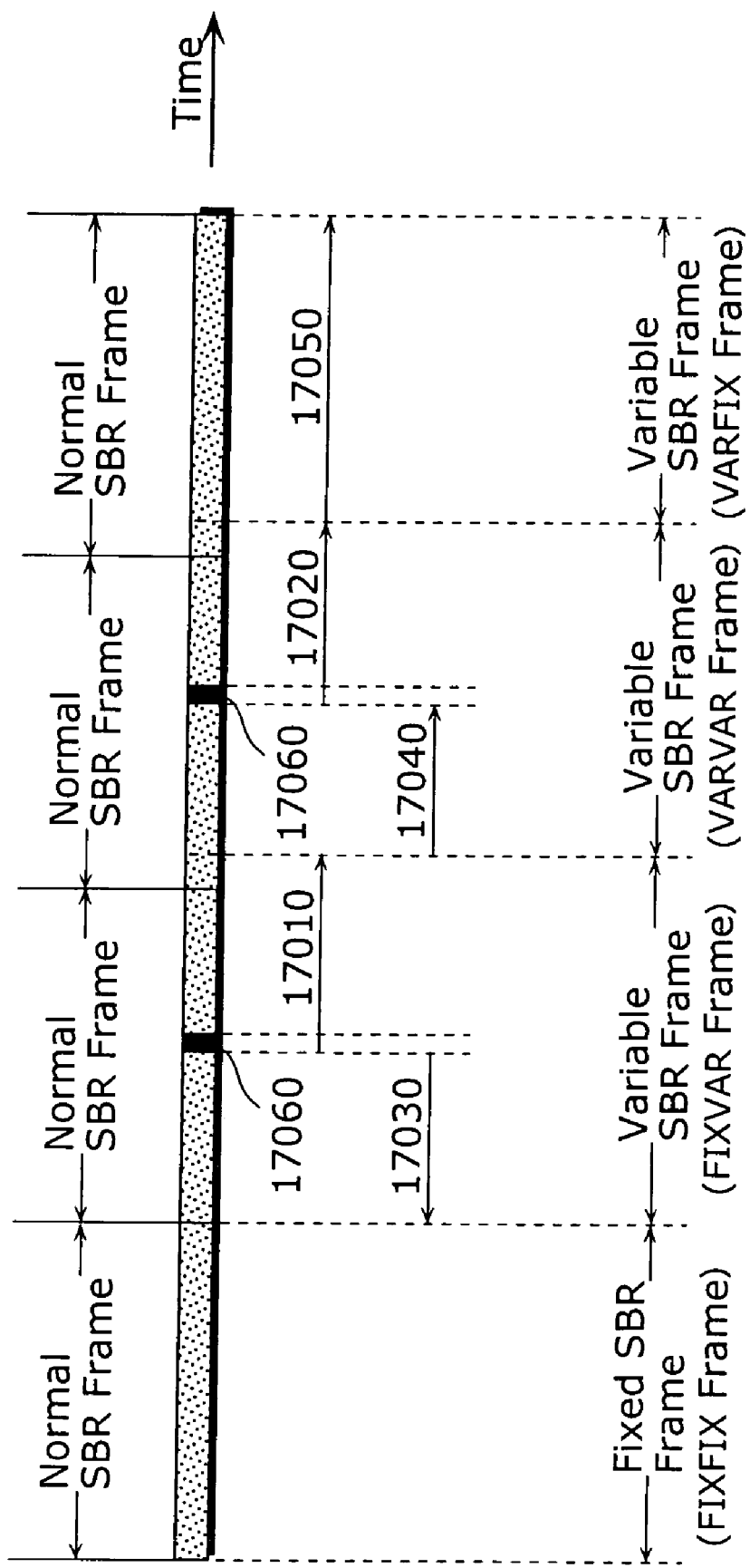
FIG. 14 is a diagram depicting employment of three search operations in various parts of the four frame types.

FIG. 14 is a diagram depicting employment of three search operations in various parts of the four frame types. FIG. 14 depicts the employment of the three search types in the four frame types, where 17010 and 17020 denote the Forward Search (Type I) operation, 17040 and 17050 denote the Forward Search (Type II) operation, and 17030 denotes the Backward Search operation.

The above has described that the post-transient region is prioritized in the intermediate border determination process, however, it is also possible to select which of the regions should be prioritized by evaluating signal variations. If the signal variation is lager in the pre-transient region, the pre-transient region is prioritized, and if it is larger in the post-transient region, vice versa.

3.5.1.2 Forward Search (Type I)

This Forward Search (Type I) method is designed for a region that starts with a transient and ends with a variable border which is yet to be determined. Its objective is to determine the intermediate borders and also the end border. Three input parameters, border1, border2 and noBorderLimit must be initialized according to 12060 and 12100 of FIG. 13 to delineate the search zone (between border1 and border2), and the maximum number of borders permitted.

Figure 15:
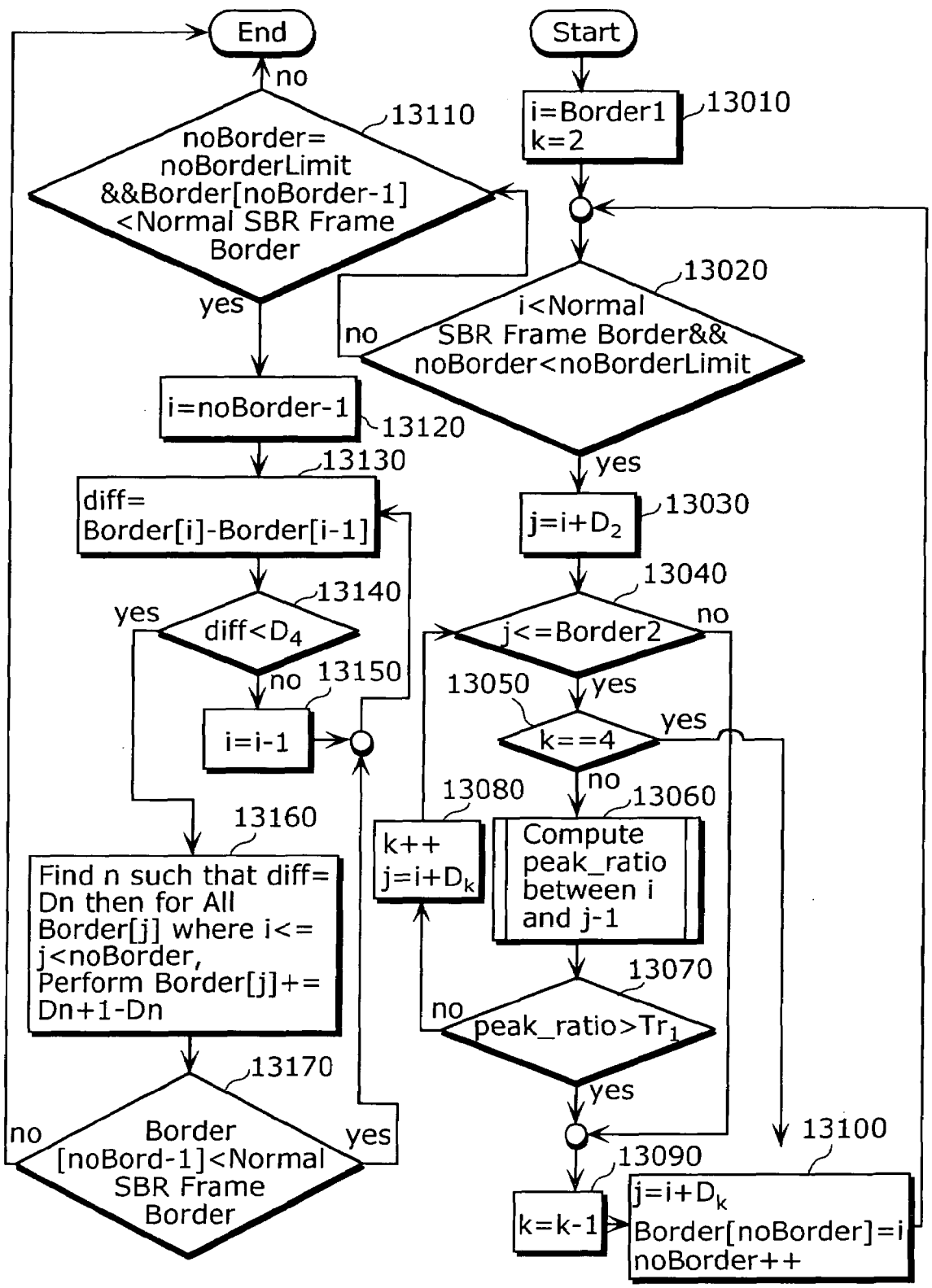
FIG. 15 is a flowchart of a Forward Search (Type I) operation.

FIG. 15 is a flowchart of the Forward Search (Type I) operation. The flowchart of this method is shown in FIG. 15. The method uses two intermediate variables i and j to track a left and a right border of a time segment. The left border is represented as i, and the right border is as j. k is used to index the relative border distance $D_k$ for the current time segment. This results from that all relative border distances can only take on a few pre-determined sizes, $d_i \in \{D_1, D_2, D_3, D_4\}$, with $0<D_1<D_2<D_3<D_4$. 13010 initializes i to border1 and k to 2. The border1 is the transient time slot. This means that 13010 will set an intermediate border i at a relative border distance $D_2$ in the time segment forward from the transient time slot border i=border1. 13020 checks whether i is still below the nominal SBR frame border, in other words, whether the transient time slot has exceeded the border of the normal SBR frame to be the current frame, and also whether the number of borders 'noBorder' has exceeded the limit number of borders 'noBorderLimit'. If they have not yet exceeded, more intermediate borders can still be instantiated, so 13030 sets the next possible edge of the current time segment, $j=i+D_2$. This means that 13020 checks whether it is possible or not to set an intermediate border at a distance $D_2$ from the transient time slot. 13040 checks j to determine whether its value exceeds border2. This means that 13040 determines whether or not an intermediate border j exceeds the end of the current frame (normal SBR frame+V).

If it does, then $D_k$ (here, $D_k=D_2$) is not a usable relative border distance. The method reverts to the previous relative border distance, $D_{k-1}$, which is $D_1$, by subtracting 1 from k in 13090 and registering a new border at $i+D_k$, which is $j=i+D_1$. The number of borders is updated by incrementing noBorder. If the method arrives at 13100 via the 'no' decision path of 13040, then the border just registered would later become the variable end border of this SBR frame.

On the other hand, if 13040 produces a 'yes' decision, it proceeds to evaluate a signal variation criterion to find out whether a new border is necessary. However, if $D_k$ is already the maximum allowed relative border distance ($D_4$ in the present embodiment), in other words, if the relative border distance is set as the maximum distance as 13050, as reflected in 13050, then the signal variation criterion does not need to be evaluated as a new border becomes compulsory. The process would proceed directly to 13100 to register the new border.

If $D_k$ is not $D_4$ yet, then 13050 produces a 'no' decision, and a variable peak_ratio represented in the following equation is evaluated in 13060 for the region between i and j−1. One possible criterion for a new intermediate border can be based on checking the ratio of the energy of each time slot to the average energy of the entire time segment. It is carried out in 13070 as shown:

$$\text{peak\_ratio} = \min\left\{\frac{ET_m}{ET}\right\} > Tr_1, \text{ for } i \le m \le j-1$$

where, $ET_m$ is the energy of time slot m,

ET is the average energy of all time slots, computed from i to j−1

$Tr_1$ is a pre-determined threshold value.

Another possible signal variation criterion can be based on comparing the largest and smallest energy as follows:

$$\text{peak\_ratio} = \frac{\text{largest } ET_m \text{ of all time slots from } i \text{ to } j-1}{\text{smallest } ET_m \text{ of all time slots from } i \text{ to } j-1} > Tr_1$$

Lastly, the signal variation criterion can be based on comparing the largest and smallest absolute amplitudes as follows:

$$\text{peak\_ratio} = \frac{\text{largest absolute amplitude of all time slots from } i \text{ to } j-1}{\text{smallest absolute amplitude of all time slots from } i \text{ to } j-1} > Tr_1$$

If the peak_ratio exceeds a threshold $Tr_1$, then the large signal variation warrants a new border. However, as the current $D_k$ causes the large signal variation, $D_{k-1}$ should be the desired relative border distance. As a result, the value of k is decremented in 13090 and a new border is registered in 13100.

If the peak_ratio is not above the threshold $Tr_1$, the signal variation is considered fairly even, so a larger $D_k$ is attempted by first incrementing k followed by adjusting j in 13080. This means that, in the region with small signal variation, a border is set with a greater distance in the time segment.

The process repeats until finally 13020 returns a 'no' decision. Then the process proceeds to 13110 to check whether despite using up all the noBorderLimit, the last border (which would become the variable end border) is still below the nominal SBR frame border. This is an important consideration because the SBR syntax requires that the end border be equal or greater than the nominal SBR frame border. If not the case, the operation safely terminates. If it is the case, the method begins a process of expanding the relative border distances until the last border satisfies the above requirement.

One possible method to expand the relative border distances is by sacrificing the relative border distance that is the furthest away from the transient border first. Starting from 13120, i is initialized to index the last border. 13130 checks the relative border distance between border[i] and border[i−1]. If the difference is not less than $D_4$, this relative border distance cannot be expanded, so i is decremented so that the relative border distance between border[i−1] and border[i−2] is checked subsequently. However, if the difference is below $D_4$, the relative distance between border[i] and border[i−1] is expanded in 13160. The process is repeated until the last border is greater or equal to the nominal SBR frame border as verified in 13170.

Another method of expanding the relative border distances is more computationally intensive. It tries to increase every relative border distance between borders, check the signal characteristics between the new borders, and applies the actual increase to the relative border distance that causes the least overall increase in between-border signal variations. Then the operation is repeated until the end border becomes equal or greater than the nominal SBR frame border. However, from experience, the region that is least varying is also the region that is furthest away from the transient border, because if the region near the transient border were the most varying, this characteristic would have already been captured by the presence of closely spaced intermediate borders near the transient border.

3.5.1.3 Forward Search (Type II)

This Forward Search (Type II) method is designed for a region that starts with a variable or fixed border, and ends with a border that has already been determined, such as the transient border or a fixed border. Unlike the Type I method, its objective is to determine the intermediate borders only. Three input parameters, border1, border2 and noBorderLimit must be initialized according to 12120 and 12160 of FIG. 13 to delineate the search zone and the maximum number of borders permitted.

Figure 16:
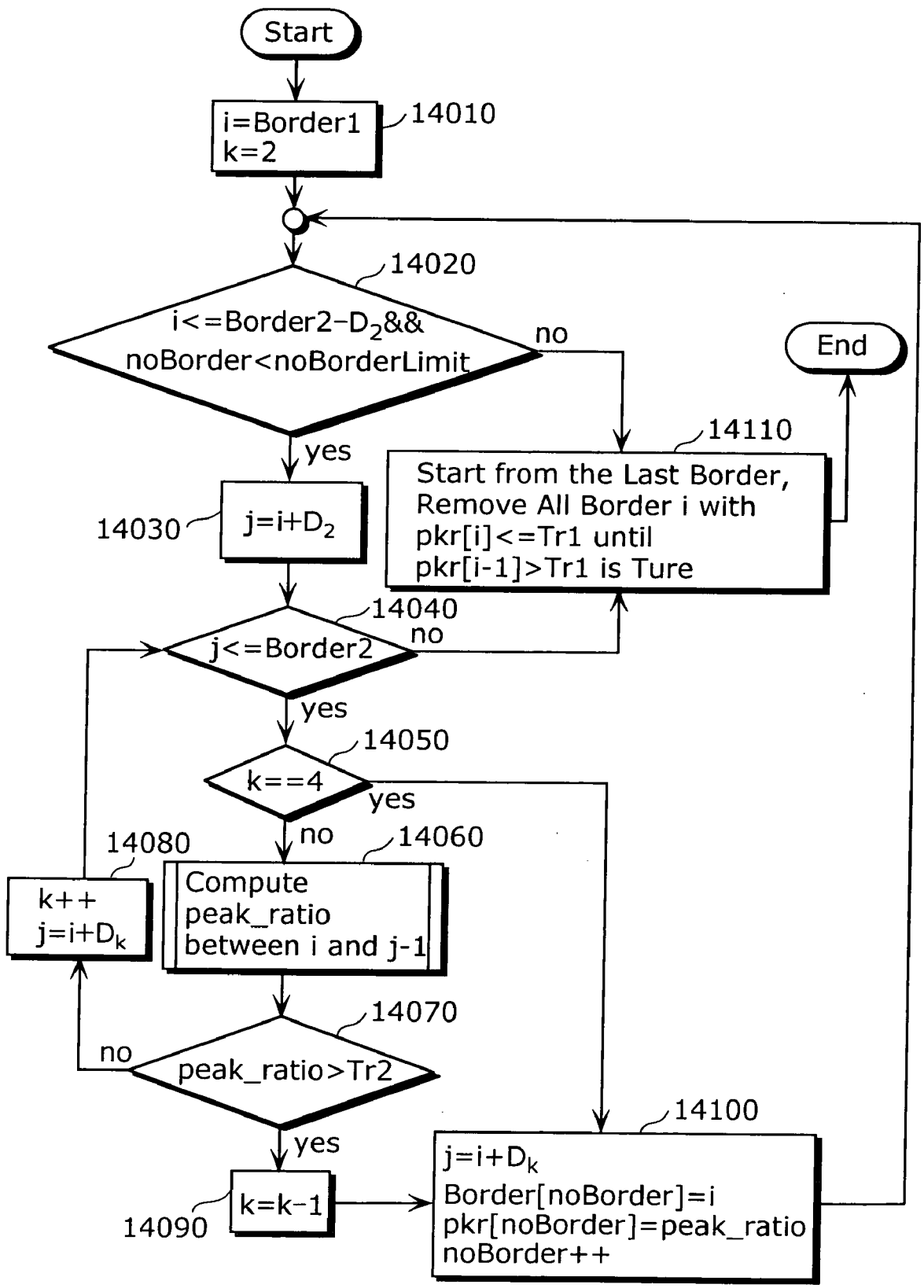
FIG. 16 is a flowchart of a Forward Search (Type II) operation.

FIG. 16 is a flowchart of the Forward Search (Type II) operation. The flowchart of this method is shown in FIG. 16. In principle, the two search methods are the same. Therefore, operations 14010 to 14100 are almost identical to operations 13010 to 13100 of FIG. 15, with a following few exceptions.

In 14020, instead of checking whether the leading edge of the current time segment is below the next nominal SBR frame, a determination is made as whether the new constraint is for the leading edge to be below border2−$D_2$.

If 14020 returns a 'no' decision, the operation terminates. There is no need for the operation to expand some relative border distances (i.e. unlike 13110 onwards in FIG. 15) because an end border needs not be found.

Similarly, in 14040, if the trailing edge of the current time segment exceeds border2, it terminates right away as opposed to registering a new border at i+$D_{k-1}$ (i.e. the branching from 13040 to 13090 in FIG. 15) as an end border is not necessary.

In 14100, the peak_ratio of a new border has to be stored when it is instantiated. This is to facilitate 14110, which removes redundant borders. The redundant borders are sometimes created because the size allowed for the current time segment has reached a maximum. Since the border locations are to be specified relative to each other, this border is necessary if more borders are to be created subsequently. However, if this is the last border, it can be removed without causing any problem.

3.5.1.4 Backward Search

Figure 1:
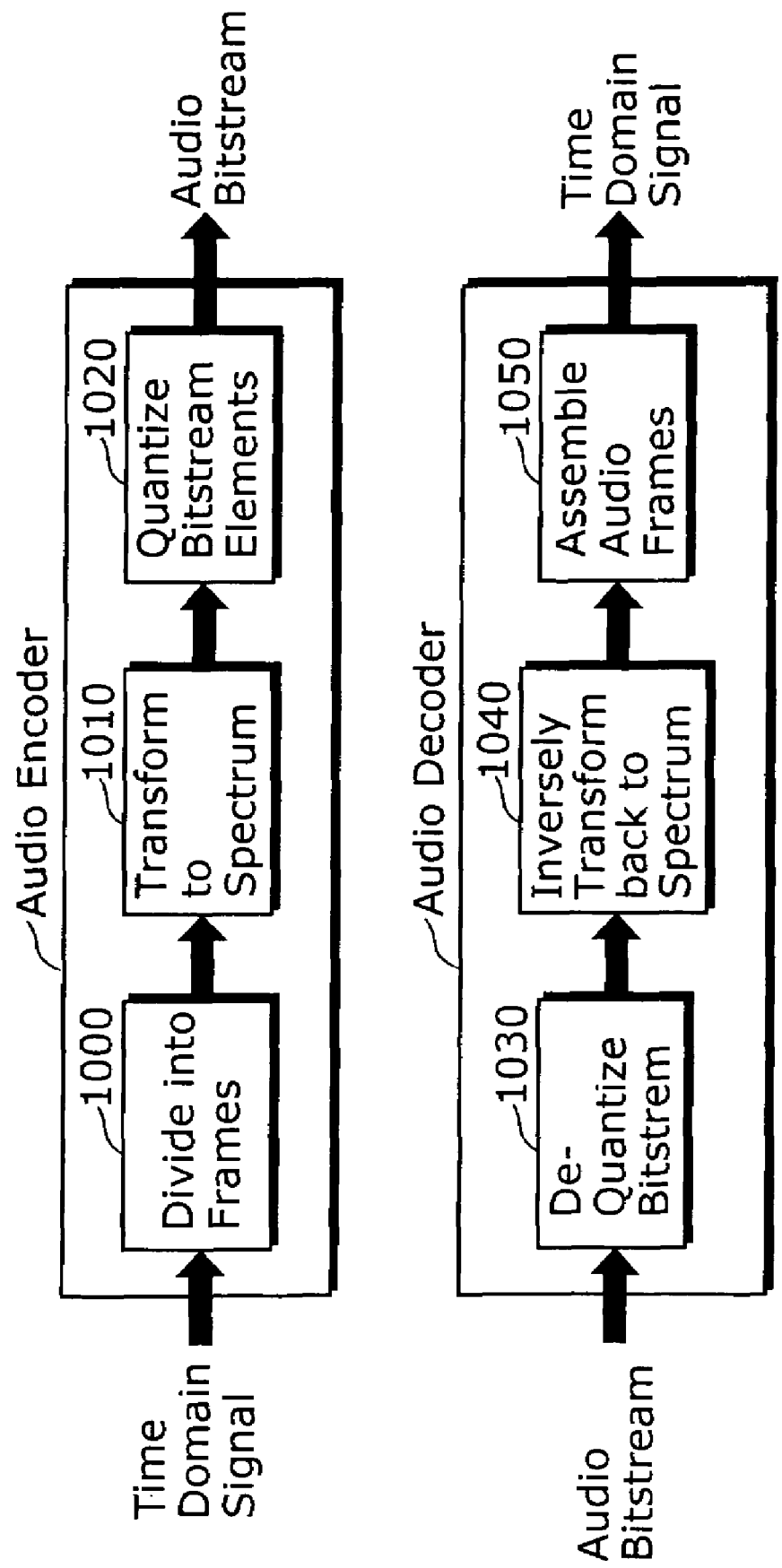
FIG. 1 is a diagram showing a typical audio coding system.
Figure 2:
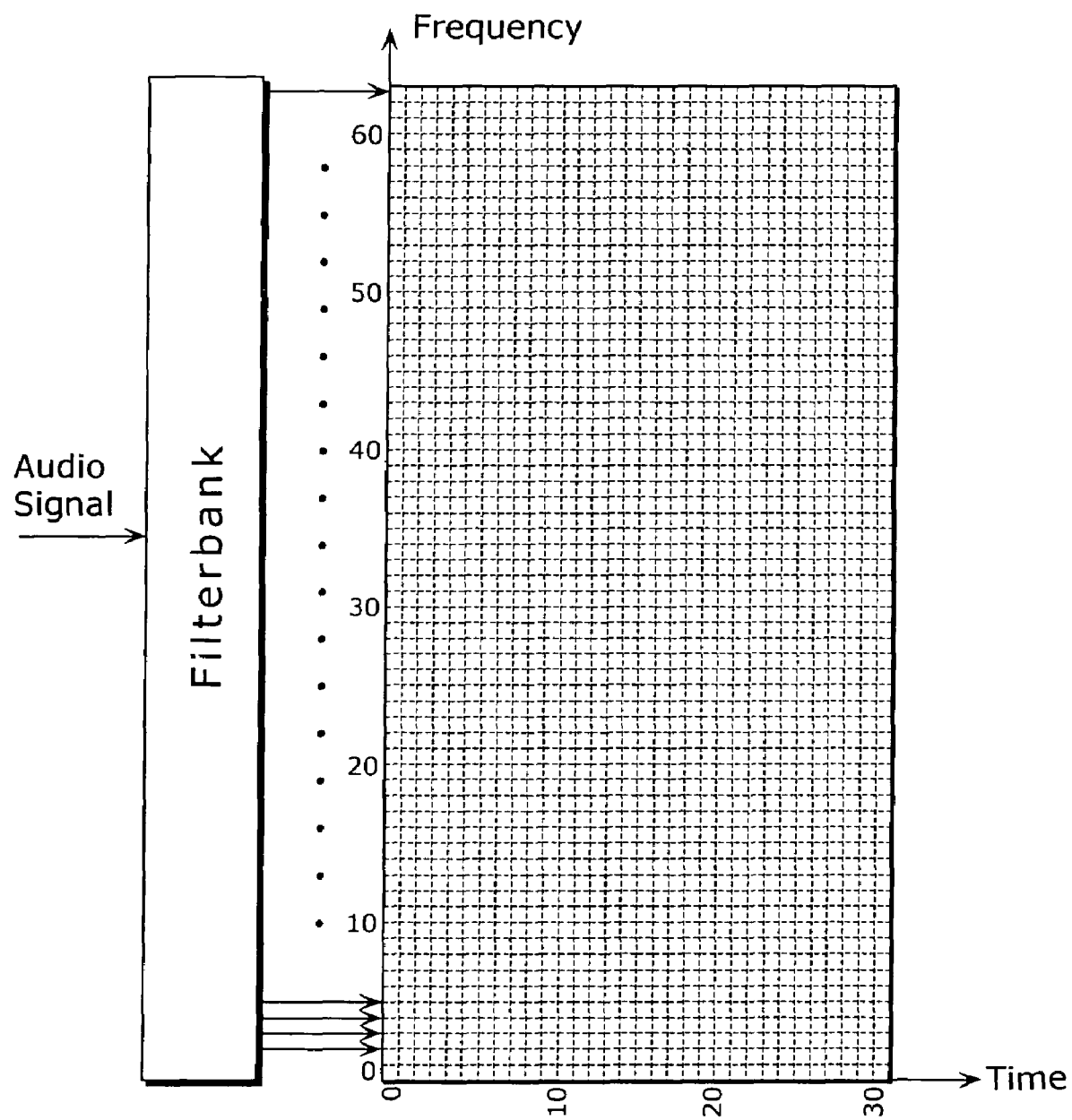
FIG. 2 is a typical time/frequency grid representation for audio coding.
Figure 3:
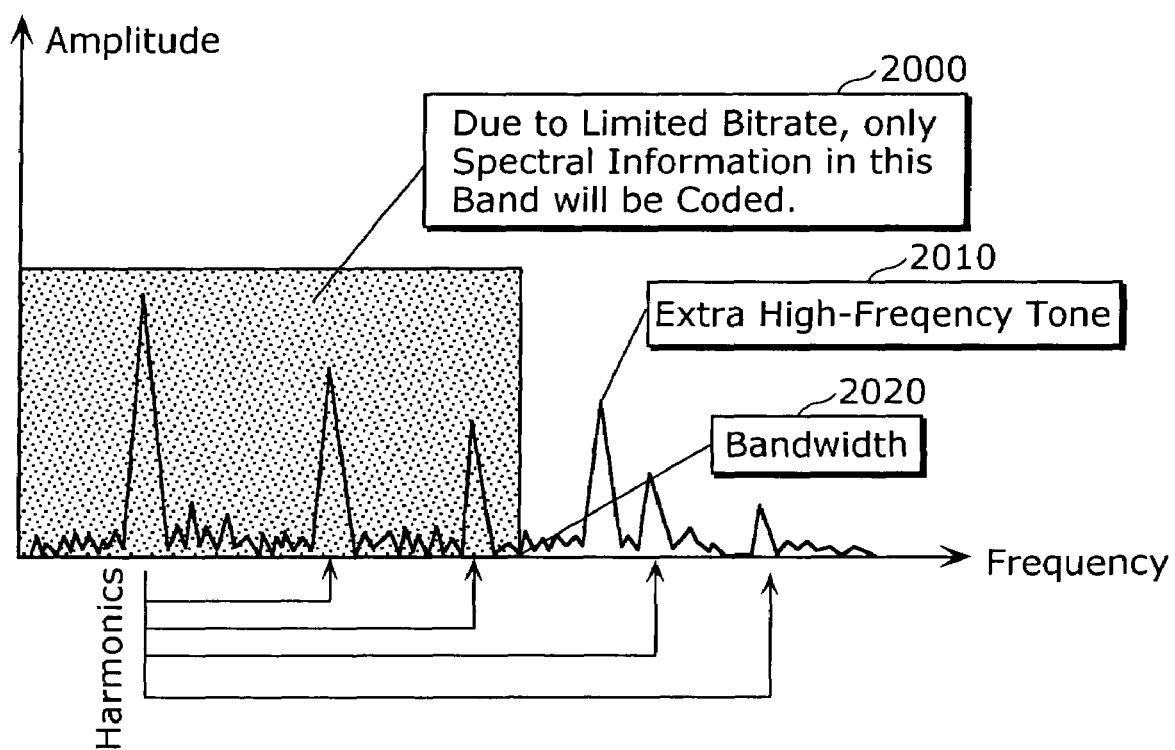
FIG. 3 is a graph illustrating limitation of bandwidth owing to bitrate consideration causes a loss of some high-frequency tones and harmonics.
Figure 4:
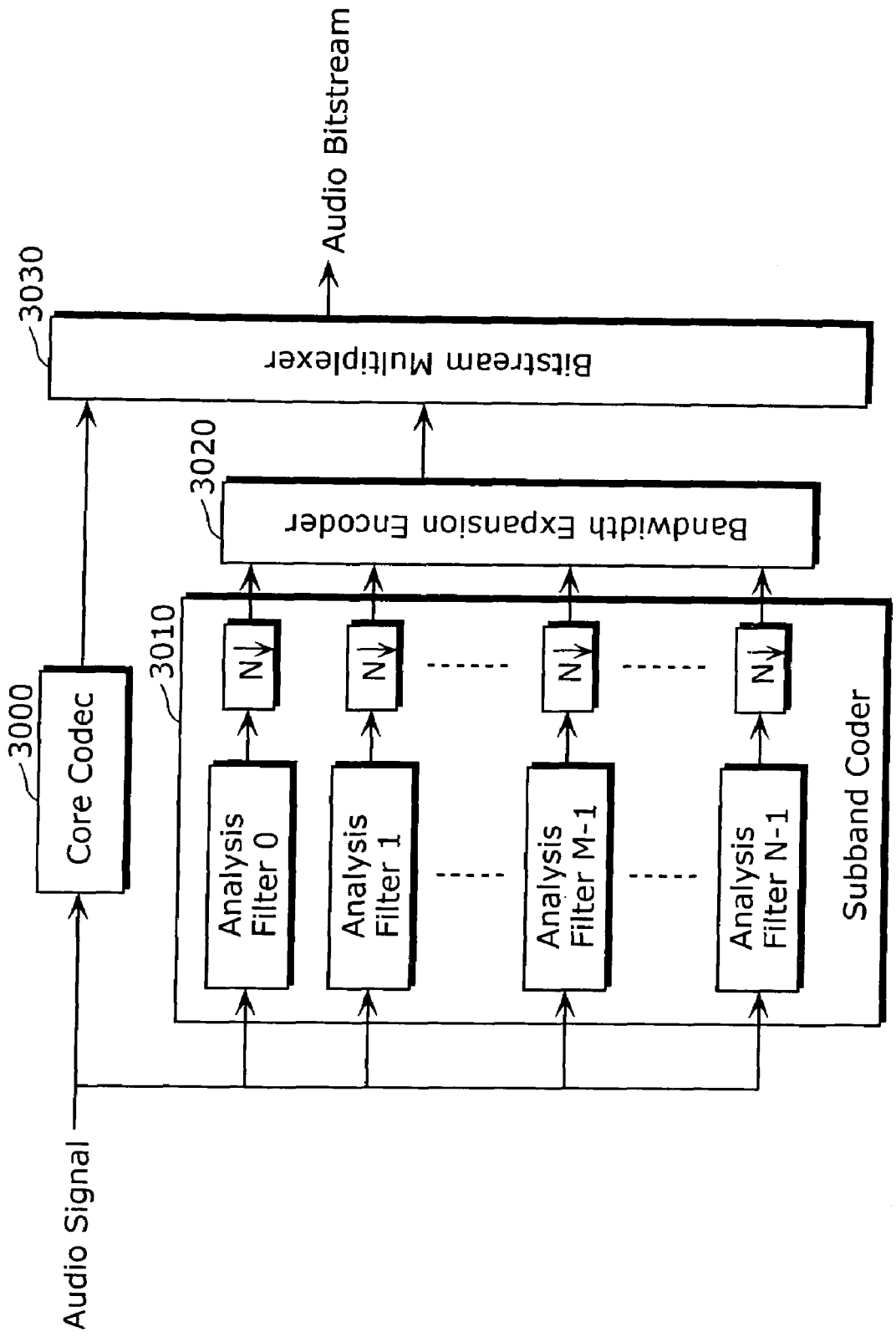
FIG. 4 is a diagram illustrating a possible encoder of a subband coding scheme for bandwidth expansion.
Figure 5:
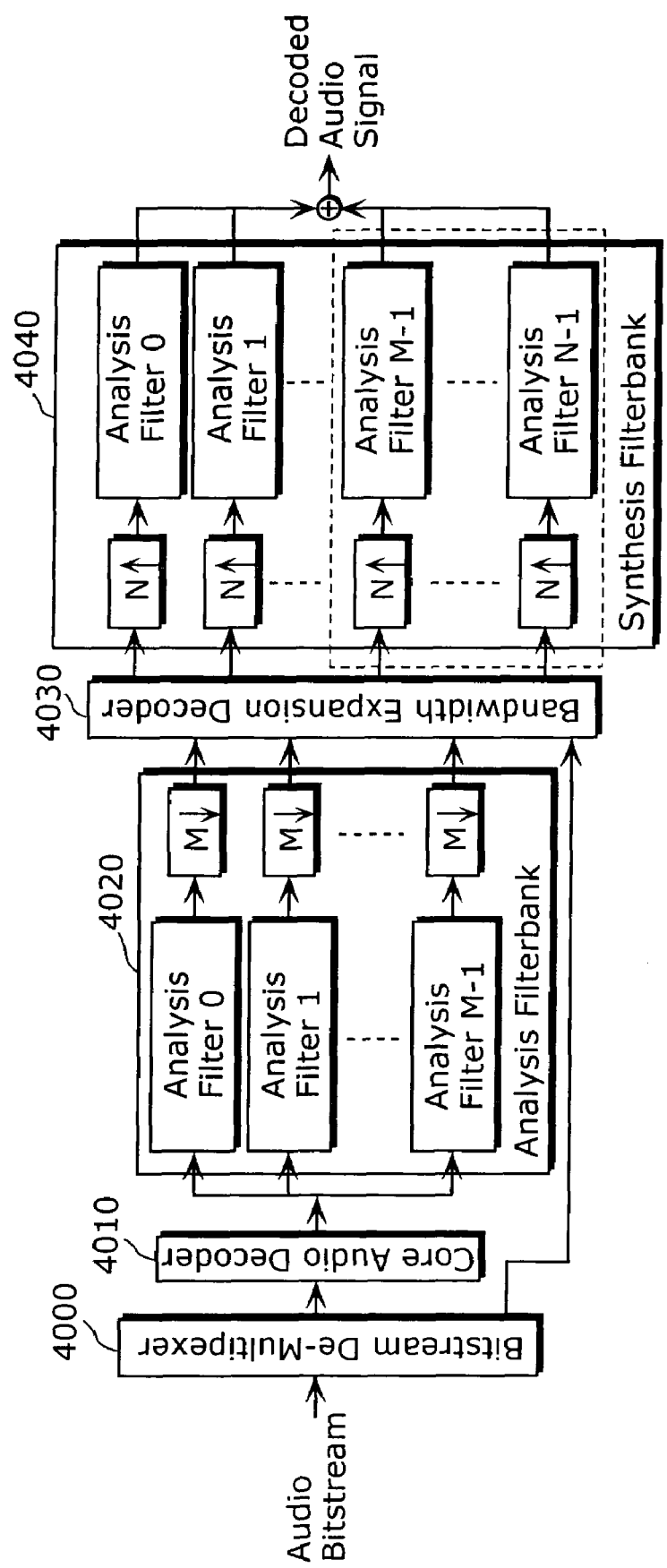
FIG. 5 is a diagram illustrating a decoder of the subband coding scheme for bandwidth expansion.
Figure 6:
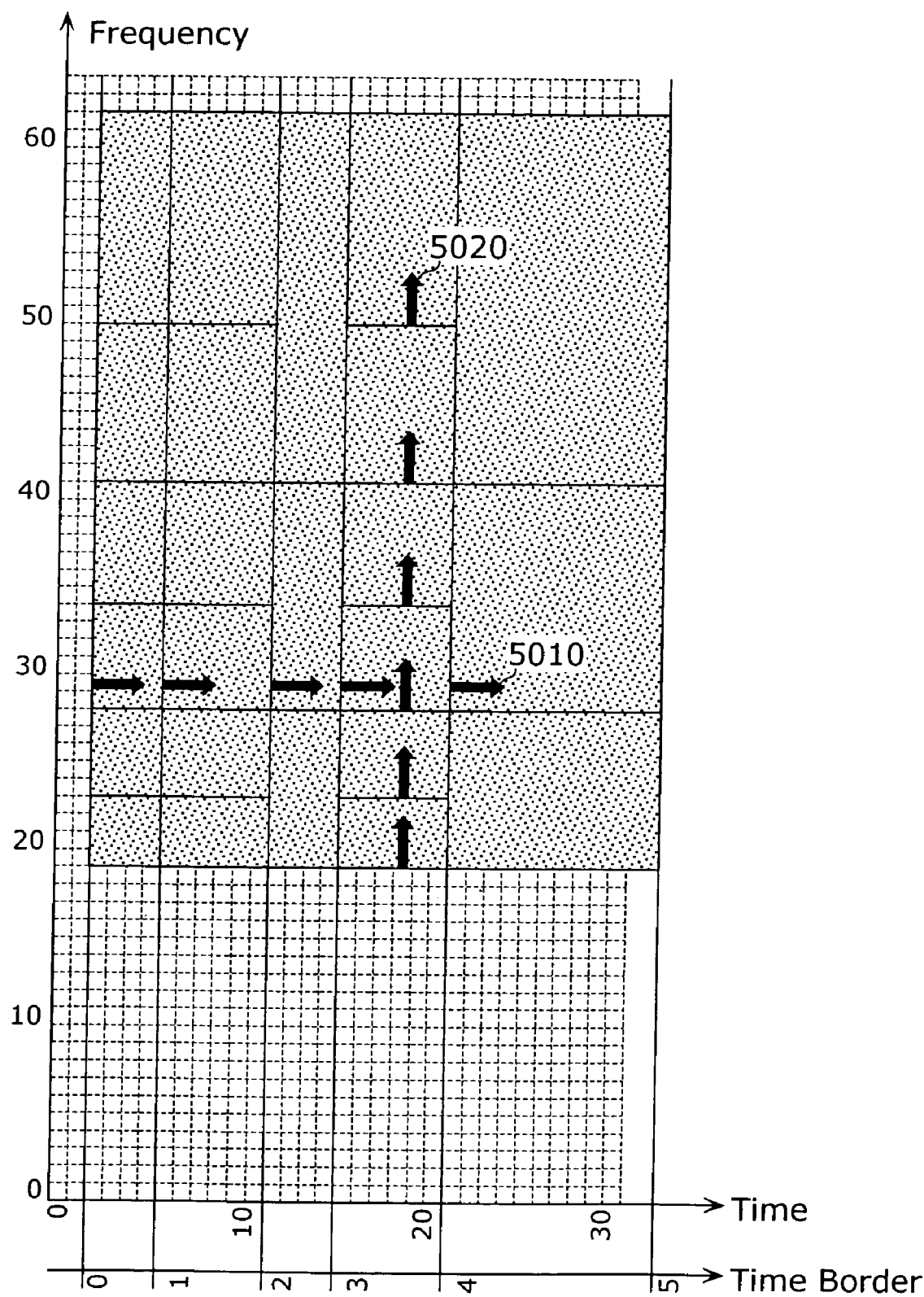
FIG. 6 is a diagram showing segmentation in time and frequency directions.
Figure 7:
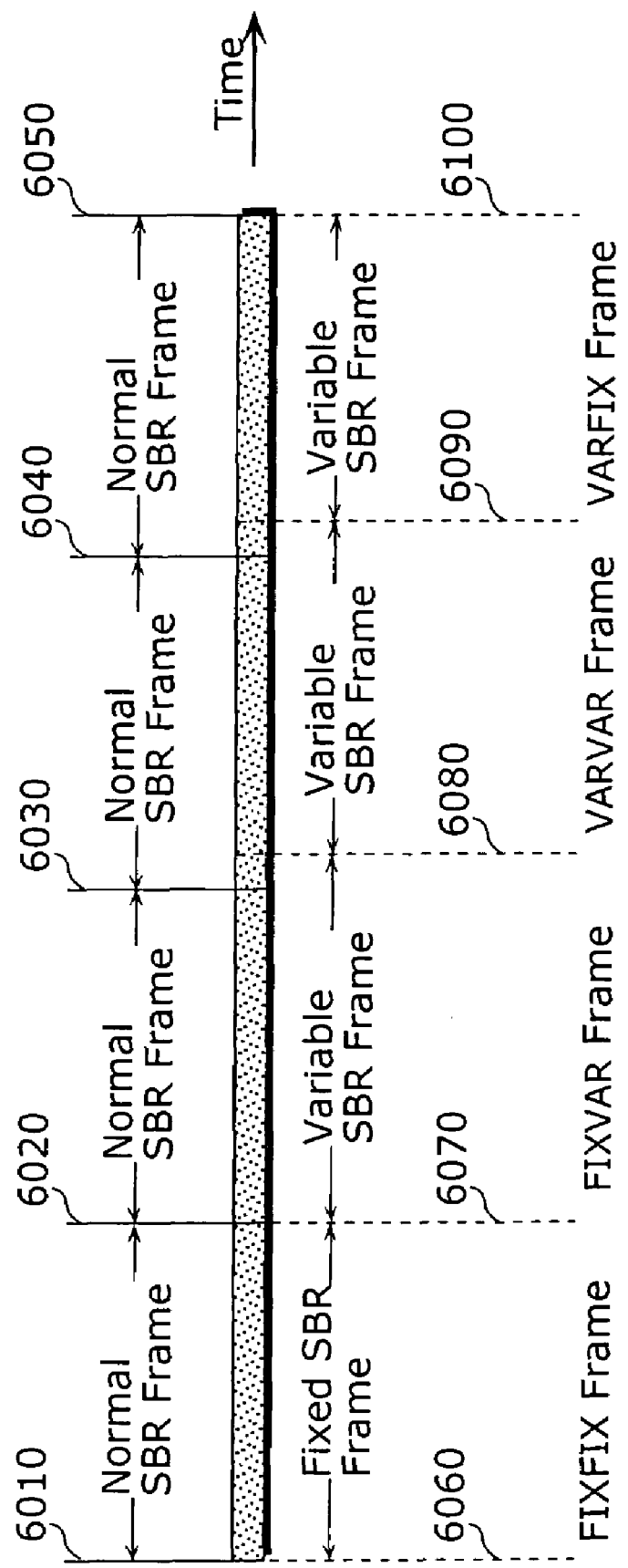
FIG. 7 is a diagram showing border relationships between four frame types.
Figure 8:
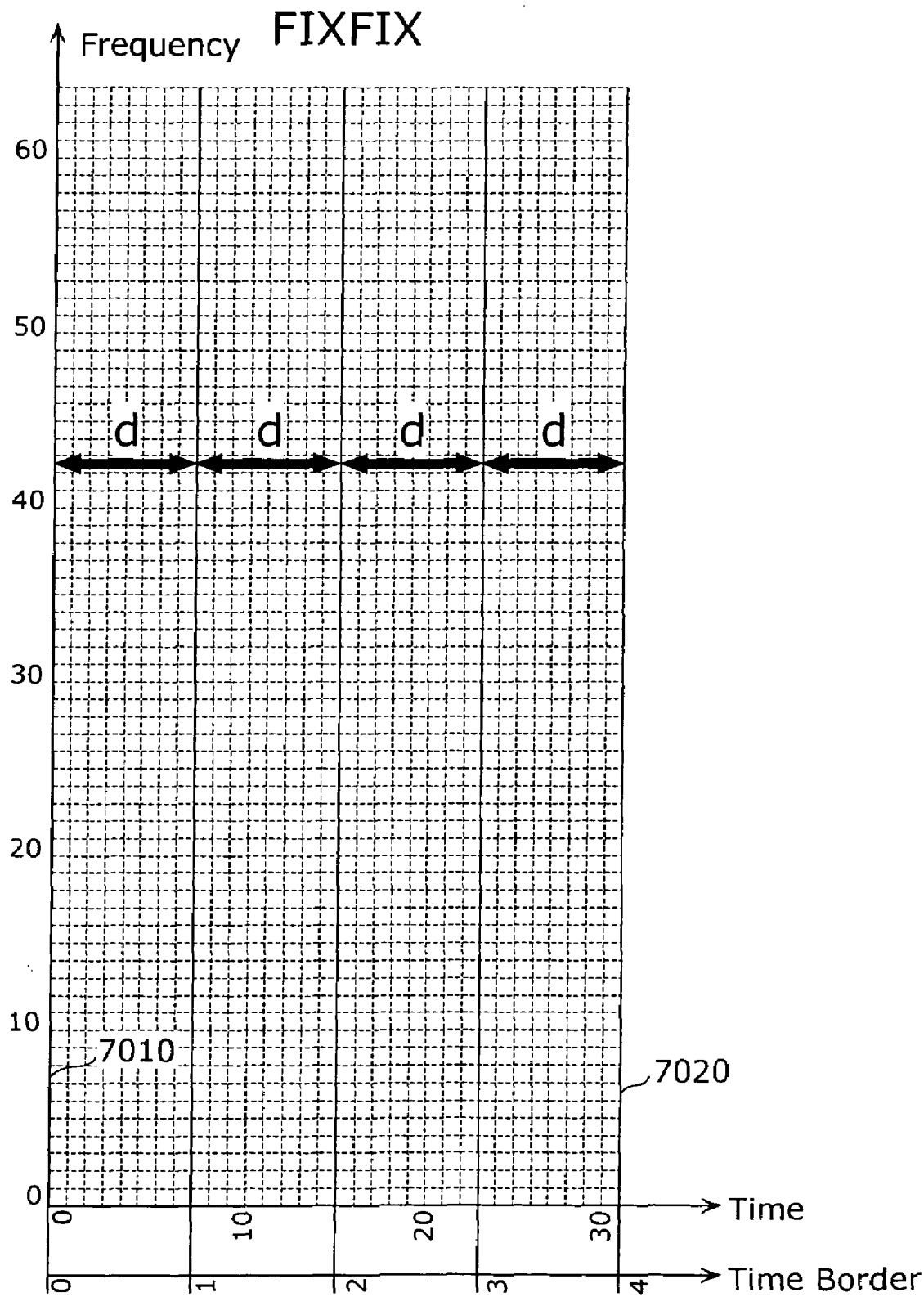
FIG. 8 is a diagram showing a FIXFIX frame with fixed start and end borders.
Figure 9:
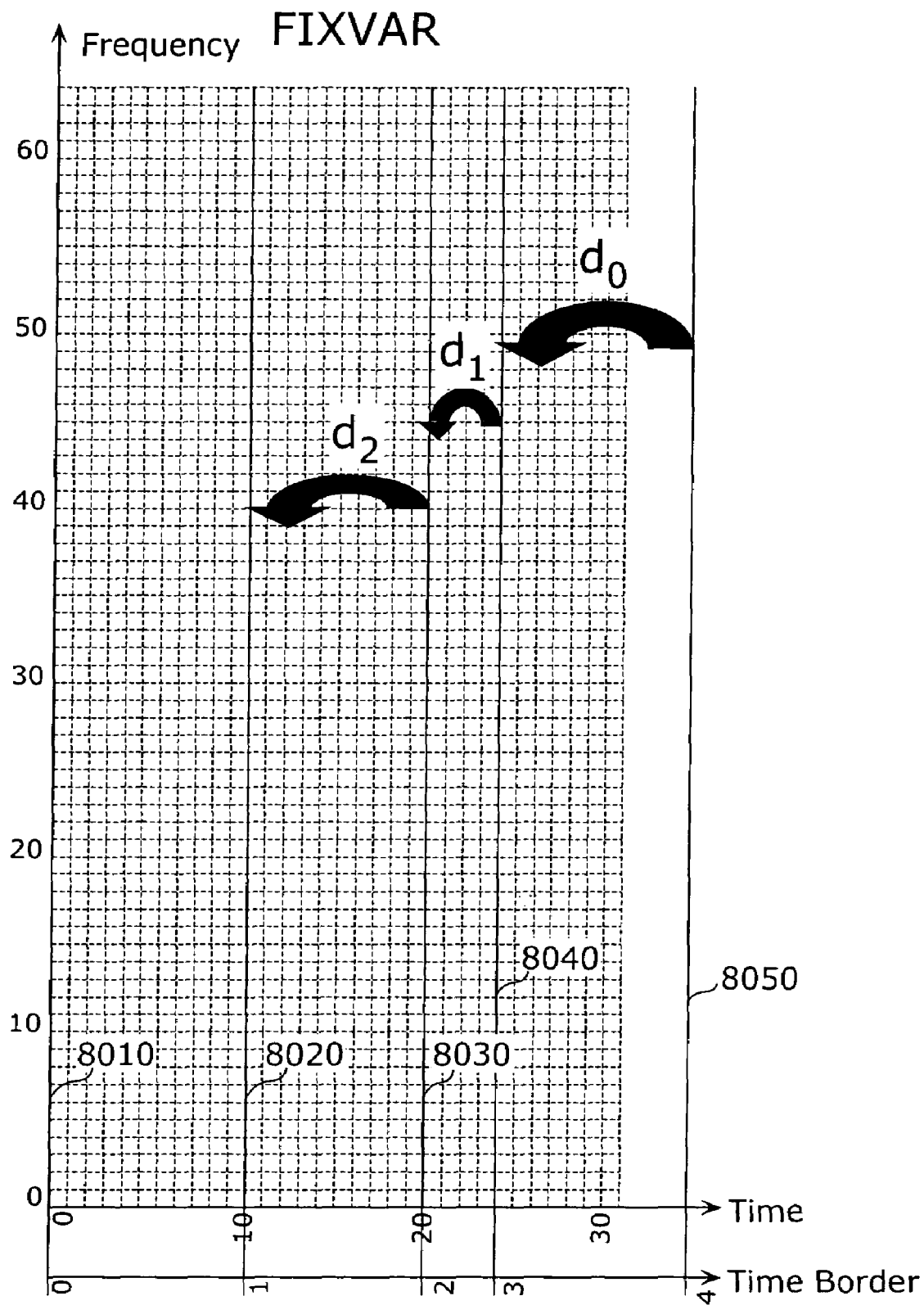
FIG. 9 is a diagram showing a FIXVAR frame with a fixed start border, a variable end border greater than a nominal SBR frame border, and some intermediate borders specified relative to the end border or each other.
Figure 10:
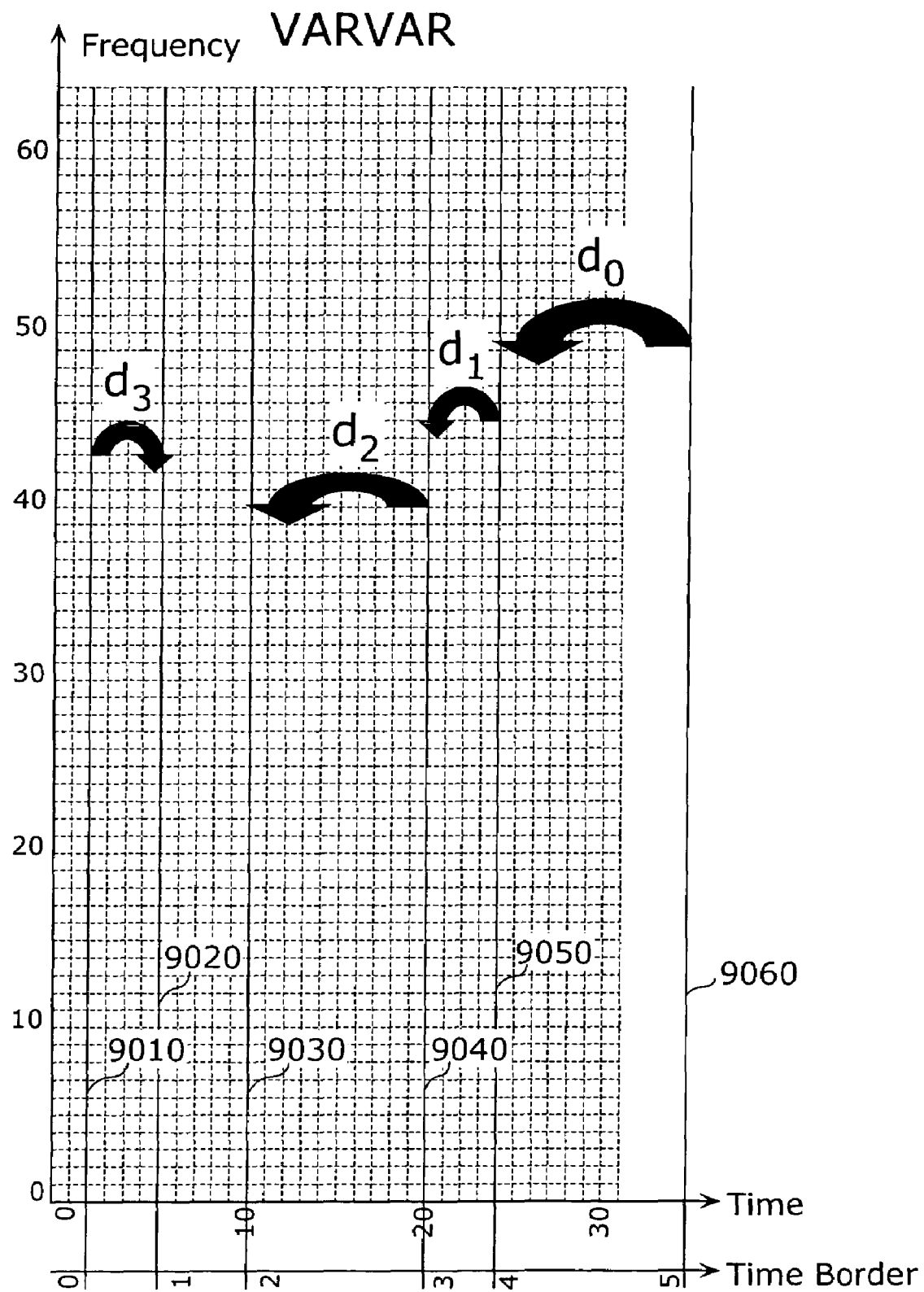
FIG. 10 is a diagram showing a VARVAR frame with a variable start border, a variable end border greater than the nominal SBR frame border, and some intermediate borders specified relative to the two variable borders or each other.
Figure 11:
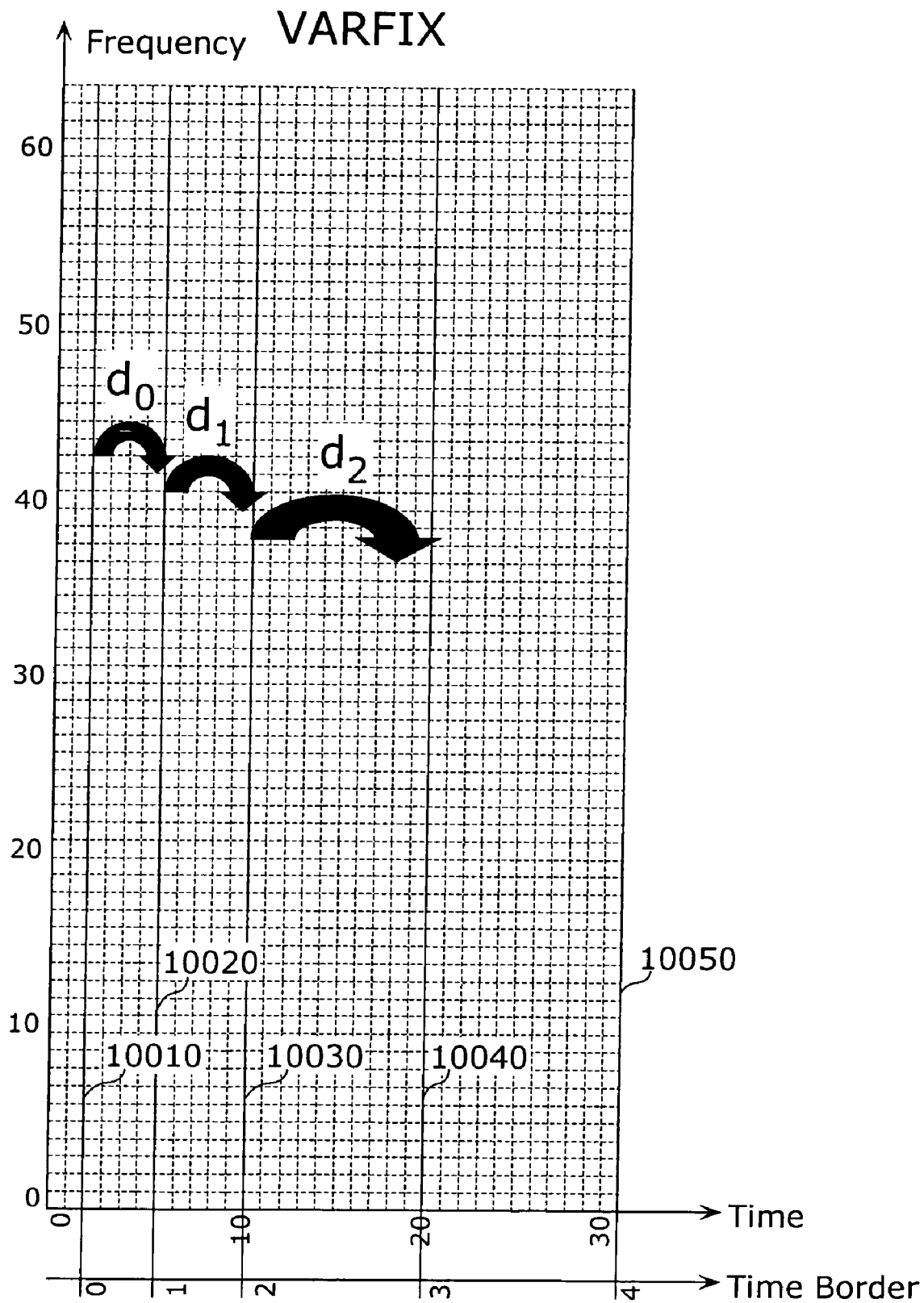
FIG. 11 is a diagram showing a VARFIX frame with a variable start border, a fixed end border, and some intermediate borders specified relative to the start border or each other.
Figure 12A:
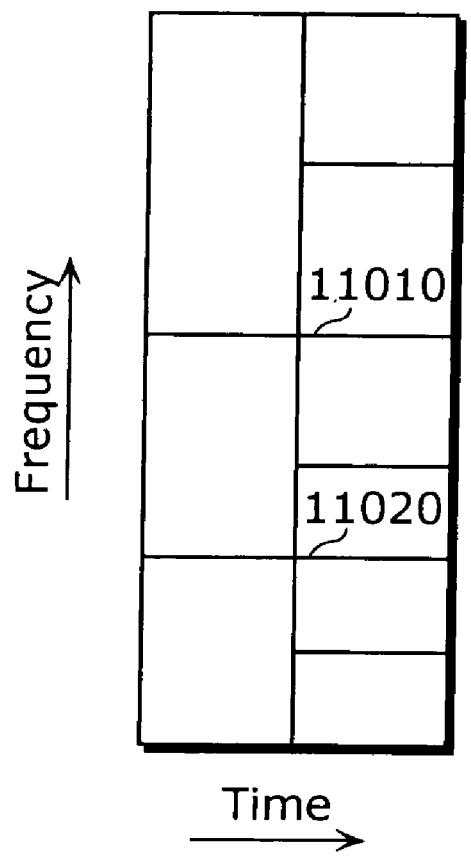
FIGS. 12A and 12B are diagrams showing border relationships between high-resolution time segments and low-resolution time segments.
Figure 12B:
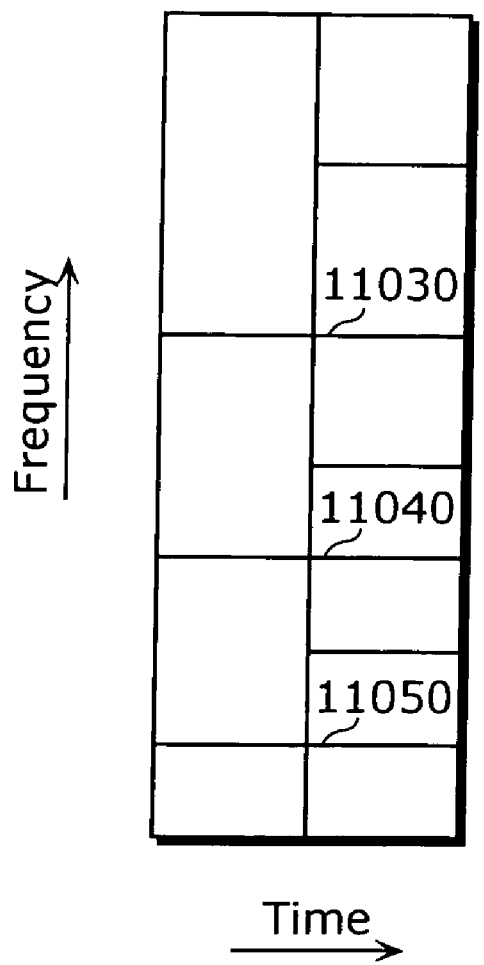

This backward Search method is designed for a region that starts with a transient and ends with a start border. Three input parameters, border1, border2 and noBorderLimit must be initialised according to 12080 of FIG. 12 to delineate the search zone and the maximum number of borders permitted.

Figure 17:
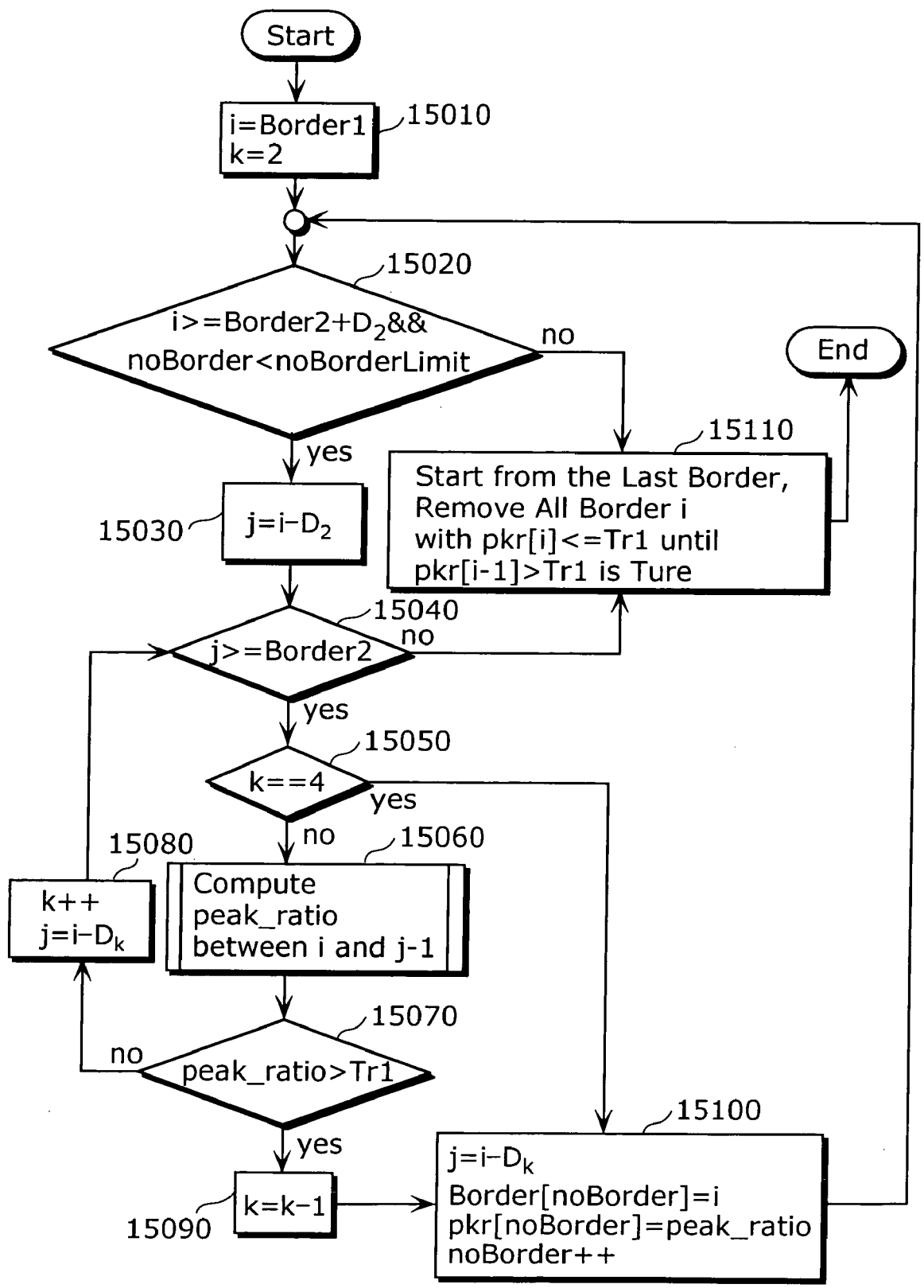
FIG. 17 is a flowchart of a Backward Search operation.

FIG. 17 is a flowchart of a Backward Search operation. In principle, the method is the same as Forward Search (Type II). Therefore, operations 15010 to 15110 are almost identical to operation 14010 to 14110, except that the operations are performed in the reverse direction: Instead of incrementing j relative to i, backward searching decrements j relative to i.

Specifically, instead of i<=border2−$D_2$ in 14020, there is i>=border2+$D_2$ in 15020 because i will get increasingly closer to the start border (i.e. border2). Instead of j<=border2 in 14040, there is j>=border2 in 15040 for the same reason mentioned above.

Instead of computing peak_ratio for time slots i to j−1 in 14060, 15060 computes peak_ratio for time slots j to i−1.

Instead of computing j=i+$D_k$ in 14030 and 14080, 15030 and 15080 compute j=i−$D_k$.

Finally, instead of computing i=i+$D_k$ in 14100, i=i−$D_k$ is computed in 15100.

3.5.2 Low Time Resolution for FIXFIX

The FIXFIX frame has no transient characteristics in its vicinity, so it is logical to use very few time borders to save coding bits. For SBR, the time/frequency grid representation for the FIXFIX frame is uniformly divided based on the number of borders chosen. A simple method to choose the number of borders is to try out the lowest number of borders and evaluate the peak_ratio of the time segments formed. If any of the peak_ratio's exceeds a certain threshold, a larger number of borders is tried, and the evaluation of peak_ratio for each time segment formed is repeated. The process terminates when the peak_ratio's of all time segments formed are below a threshold, or when the maximum number of borders has been reached.

3.5.3 Determination of Frequency Resolution

Figure 18A:
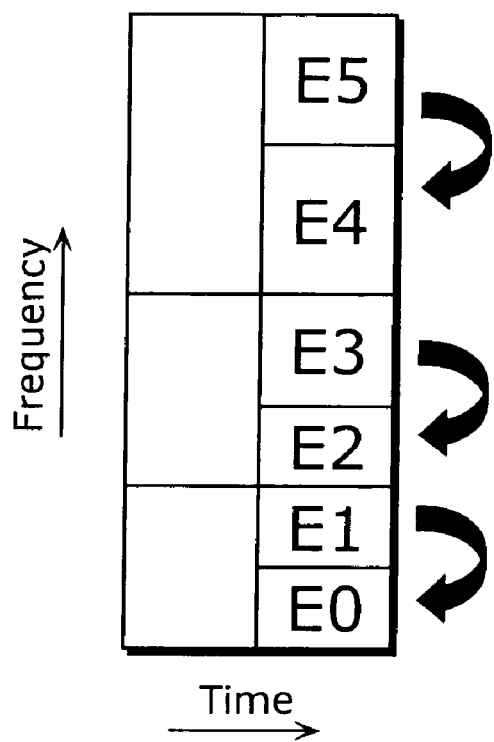
FIGS. 18A and 18B are illustrations for the frequency resolution determination unit of the present invention.
Figure 18B:
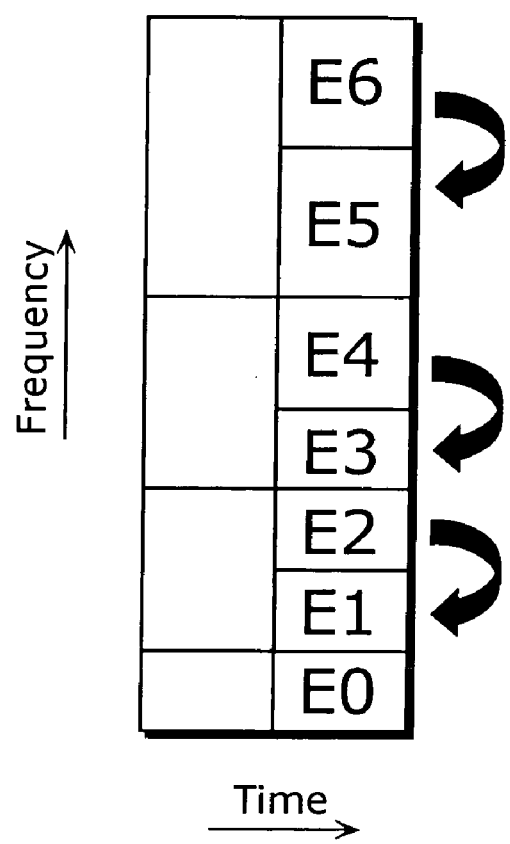

The embodiment for the determination of frequency resolution is illustrated by way of an example shown in FIGS. 18A and 18B. FIGS. 18A and 18B are illustrations for the frequency resolution determination unit of the present invention. Borders of low-resolution division are alternate borders of high-resolution division.

Initially, the average energy for every frequency band in a time segment is computed, assuming that a high frequency resolution is adopted. The average energy is denoted by $E_i$.

If the high frequency resolution is even in FIG. 18, then satisfying the following condition will lead to the selection of high frequency resolution; Otherwise, a low frequency resolution will be selected:

$$\min\left\{\frac{E_{2i+1}}{E_{2i}}\right\} > Tr_2, \text{ for } i = 0, 1, 2 \ldots$$

If the high frequency resolution is odd in FIG. 18, then satisfying the following condition will lead to the selection of high frequency resolution; Otherwise, the low frequency resolution will be selected:

$$\min\left\{\frac{E_{2i+1}}{E_{2i}}\right\} > Tr_2, \text{ for } i = 0, 1, 2 \ldots$$

where $$Tr_2 \begin{cases} \text{FREQ\_RES\_THRESHOLD}_1, & \text{for the first } n \text{ time segments after a threshold border} \\ \text{FREQ\_RES\_THRESHOLD}_2, & \text{otherwise} \end{cases}$$

and
FREQ_RES_THRESHOLD$_2$>FREQ_RES_THRESHOLD$_1$.

This implies that for the n time segments after a threshold time slot, it is harder to adopt the high frequency resolution because a higher time resolution is favored.

While the average energy is used for the determination in the above embodiment, any other parameter like amplitude information, which represents signal variation, can be used instead.

INDUSTRIAL APPLICABILITY

The encoder according to the present invention is suited for use as an audio signal coding device equipped in, such as a personal computer with a communication function, a PDA, a broadcast station of digital broadcasting, a distribution server and a portable telephone for distributing contents. Furthermore, the decoder according to the present invention is suited for use as an audio decoding device equipped in, such as a personal computer with a communication function or a memory reading function for receiving distributed music contents and the like, a PDA, and a portable telephone, a portable audio recorder, a STB for receiving digital broadcasting.

The invention claimed is:

1. A method for determining a time border and a frequency resolution in spectral envelope coding of an audio signal utilizing a time/frequency grid, said method comprising:

deriving a start time border of a current frame from an end time border of a previous frame of envelope data;

detecting, by a transient detector, a transient time slot in spectral data between the start time border and the end time border within a predetermined allowed region, a degree of the transient exceeding a certain drasticness; and finding and instantiating an actual end time border and intermediate time borders in the spectral data between the transient time slot and the end time border of the current frame within the predetermined allowed region by comparing the transient drasticness with a predetermined signal variation criterion.

2. The method for determining the time border and the frequency resolution according to claim 1, further comprising deriving the frequency resolution in a time segment by evaluating energy of every frequency band partitioned by low-resolution borders represented by a predetermined frequency for every time segment obtained by dividing the current frame using the intermediate time borders and the end time border.

3. The method for determining the time border and the frequency resolution according to claim 2 wherein the signal variation criterion is evaluated by computing ratios between the energies of the frequency bands for every time segment found, and when minimum of the ratios exceeds a threshold, a high frequency resolution is adopted; Otherwise, a low frequency resolution is adopted.

4. The method for determining the time border and the frequency resolution according to claim 3 wherein the threshold is higher in a plurality of time segments including and immediately following the transient time border, to make it more difficult to switch to high frequency resolution in the region including the transient time slot.

5. The method for determining the time border and the frequency resolution according to claim 1 wherein, when an allowed number of borders has been exhausted but a distance between the start time border and the end time border does not satisfy a minimum required value, a distance between the start time border and an intermediate border nearest the end time border in the current frame is expanded until a minimum required value is attained.

6. The method for determining the time border and the frequency resolution according to claim 5 wherein the expansion of the intermediate border can occur to a time segment furthest away from the transient time slot within the frame first, and time segments nearer to the transient time slot are considered only when the expansion of the further border has reached its syntactic limit.

7. The method for determining the time border and the frequency resolution according to claim 5
wherein the expansion of the intermediate border can also try to increase every time segment, check signal characteristics of the new time segment formed, and applies the actual increase to the time segment that causes the least overall increase in between-border signal variations.

8. The method for determining the time border and the frequency resolution according to claim 1,
wherein more intermediate time border is instantiated in the spectral data between the transient time slot and the start time border by evaluating the predetermined signal variation criterion, when the allowed number of borders has not been exhausted.

9. The method for determining the time border and the frequency resolution according to claim 1,
wherein the finding of the intermediate time border includes first defining a temporary time segment with a previously found time border and a moving time border which moves progressively away from the previous time border, and then evaluating the signal variation criterion for every move the moving time border makes.

10. The method for determining the time border and the frequency resolution according to claim 9,
wherein the signal variation criterion is a ratio between minimum energy of a time slot within the temporary time segment and average energy of the temporary time segment.

11. The method for determining the time border and the frequency resolution according to claim 10
wherein a new intermediate border or an end border is instantiated according to the moving time border to define a new time segment, when the computed ratio exceeds a threshold.

12. A program coded in programming language which provides a function achieved by the method for determining the time border and the frequency resolution according claim 1.

13. A data recording medium for storing the program according to claim 12.

14. A method for determining a time border and a frequency resolution by a bandwidth expansion technology in spectral envelope coding of an audio signal utilizing a time/frequency grid, said method comprising:
transforming the audio signal into a plurality of low-frequency subband signals by an analysis filterbank;
replicating portions of the subband signal to a high-frequency region, dividing the replicated subbands into time segments using time borders information and subsequently into frequency bands using frequency resolutions information, and subsequently adjusting the subbands by envelope data; and
transforming the low-frequency subband signals and the envelope-adjusted subband signals into a bandwidth-expanded time domain signal,
wherein said method further comprising:
deriving a start time border from an end time border of a previous frame of envelope data;
detecting, by a transient detector, a most drastic transient time slot in spectral data between the start time border and furthest allowed end time border;
finding and instantiating an actual end time border and intermediate time borders in the spectral data between the transient time slot and the furthest allowed end time border by evaluating a signal variation criterion; and
deriving the frequency resolution by evaluating energy of every frequency band partitioned by low-resolution borders for every time segment obtained by the dividing of the replicated subbands.

15. A method for determining a time border and a frequency resolution in spectral envelope coding of an audio signal utilizing a time/frequency grid, said method comprising:
deriving a start time border from an end time border of a previous frame of envelope data;
detecting, by a transient detector, a most drastic transient time slot in spectral data between the start time border and the furthest allowed end time border;
detecting which of the regions, one between a transient border and the start time border, another between the transient border and the furthest allowed end time border, has a most varying spectral data;
when the most varying spectral data is found in the region between the transient border and the furthest allowed end time border, finding and instantiating an actual end time border and intermediate time borders in the region by evaluating a signal variation criterion;
when the most varying spectral data is found in the region between the transient border and the start time border, finding and instantiating intermediate borders in the region by evaluating a signal variation criterion, then finding and instantiating an actual end time border and intermediate time borders in the other region by evaluating a signal variation criterion; and
deriving the frequency resolution by evaluating energy of every frequency band partitioned by low-resolution borders for every time segment obtained by dividing of subbands.

16. A method for determining a time border and a frequency resolution by a bandwidth expansion technology in spectral envelope coding of an audio signal utilizing a time/frequency grid, said method comprising:
transforming the audio signal into a plurality of low-frequency subband signals by an analysis filterbank;
replicating portions of the subband signal to a high-frequency region, dividing the replicated subbands into time segments using time borders information and subsequently into frequency bands using frequency resolutions information, and subsequently adjusting the subbands by envelope data; and
transforming the low-frequency subband signals and the envelope-adjusted subband signals into a bandwidth-expanded time domain signal,
wherein said method further comprising:
deriving a start time border from an end time border of a previous frame of envelope data;
detecting, by a transient detector, a most drastic transient time slot in spectral data between the start time border and the furthest allowed end time border;
detecting which of the regions, one between a transient border and the start time border, another between the transient border and the furthest allowed end time border, a most varying spectral data;
when the most varying spectral data is found in the region between the transient border and the furthest allowed end time border, finding and instantiating an actual end time border and intermediate time borders in the region by evaluating a signal variation criterion;
when the most varying spectral data is found in the region between the transient border and the start time border, finding and instantiating intermediate borders in the region by evaluating a signal variation criterion, then finding and instantiating an actual end time border and intermediate time borders in the other region by evaluating a signal variation criterion; and deriving the frequency resolution by evaluating energy of every frequency band partitioned by low-resolution borders for every time segment obtained by the dividing of the replicated subbands.

17. A device for determining a time border and a frequency resolution in spectral envelope coding of an audio signal utilizing a time/frequency grid, said device comprising:

a start time border derivation unit operable to deriving a start time border of a current frame from an end time border of a previous frame of envelope data;

a detection unit operable to detecting a transient time slot by a transient detectior in spectral data between the start time border and the end time border within a predetermined allowed region, a degree of the transient exceeding a certain drasticness;

an instantiation operable to finding and instantiating an actual end time border and intermediate time borders in the spectral data between the transient time slot and the end time border of the current frame within the predetermined allowed region by comparing the transient drasticness with a predetermined signal variation criterion; and a frequency resolution derivation unit operable to deriving the frequency resolution in a time segment by evaluating energy of every frequency band partitioned by low-resolution borders represented by a predetermined frequency for every time segment obtained by deviding the current frame using the intermediate time borders and the end time border.

* * * * *